(12) United States Patent
Ramji et al.

(10) Patent No.: US 8,234,615 B2
(45) Date of Patent: Jul. 31, 2012

(54) CONSTRAINT PROGRAMMING BASED METHOD FOR BUS-AWARE MACRO-BLOCK PIN PLACEMENT IN A HIERARCHICAL INTEGRATED CIRCUIT LAYOUT

(75) Inventors: Shyam Ramji, Lagrangeville, NY (US); Bella Dubrov, Tel-Aviv (IL); Haggai Eran, Haifa (IL); Ari Freund, Haifa (IL); Edward F. Mark, Poughkeepsie, NY (US); Timothy A. Schell, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 12/849,973

(22) Filed: Aug. 4, 2010

(65) Prior Publication Data

US 2012/0036491 A1 Feb. 9, 2012

(51) Int. Cl.
*G06F 17/50* (2006.01)
(52) U.S. Cl. ........ 716/129; 716/122; 716/123; 716/124; 716/130; 716/131; 716/132; 703/16
(58) Field of Classification Search .................. 716/122, 716/123, 124, 129, 130, 131, 132; 703/16
See application file for complete search history.

(56) References Cited

U.S. PATENT DOCUMENTS

| | | | | |
|---|---|---|---|---|
| 4,577,276 A * | 3/1986 | Dunlop et al. | ................. | 716/123 |
| 4,908,772 A * | 3/1990 | Chi | ................. | 716/122 |
| 5,360,767 A | 11/1994 | Narayanan et al. | | |
| 5,818,729 A * | 10/1998 | Wang et al. | ................. | 716/122 |
| 6,298,468 B1 | 10/2001 | Zhen | | |
| 6,317,864 B1 * | 11/2001 | Kikuchi et al. | ................. | 716/122 |
| 6,389,379 B1 * | 5/2002 | Lin et al. | ................. | 703/14 |
| 6,477,688 B1 * | 11/2002 | Wallace | ................. | 716/107 |
| 6,519,749 B1 * | 2/2003 | Chao et al. | ................. | 716/123 |
| 6,584,608 B1 * | 6/2003 | Kumada et al. | ................. | 716/129 |
| 6,609,237 B1 * | 8/2003 | Hamawaki et al. | ................. | 716/131 |
| 6,865,726 B1 * | 3/2005 | Igusa et al. | ................. | 716/105 |
| 7,013,438 B1 * | 3/2006 | Saldanha et al. | ................. | 716/104 |
| 7,013,450 B2 * | 3/2006 | Teig et al. | ................. | 716/129 |
| 7,062,743 B2 | 6/2006 | Kahng et al. | | |
| 7,155,694 B2 * | 12/2006 | Eichenseer et al. | ................. | 716/123 |
| 7,269,815 B2 * | 9/2007 | Wein et al. | ................. | 716/105 |
| 7,418,683 B1 * | 8/2008 | Sonnard et al. | ................. | 716/122 |
| 7,533,360 B1 * | 5/2009 | Ren et al. | ................. | 716/126 |
| 7,577,933 B1 | 8/2009 | Wu et al. | | |
| 7,603,641 B2 * | 10/2009 | Lin | ................. | 716/120 |

(Continued)

OTHER PUBLICATIONS

Smith, M.J.S.: Application Specific Integrated Circuits, VLSI Sstems Series Addison-Wesley (1997) , http://www10.edacafe.com/book/ASIC/ASICs.php#anchor749424.

(Continued)

*Primary Examiner* — Phallaka Kik
(74) *Attorney, Agent, or Firm* — H. Daniel Schnurmann (57) ABSTRACT

Assigning pins to macro-blocks of an Integrated Circuit (IC) chip is described. The macro-block pin assignments are automatically placed using Constraint Programming (CP) techniques to position the pins on the periphery of a macro-block. Bus-ordering and pin-spacing constraints are performed considering all the nets forming the IC design simultaneously. The CP formulation includes modeling detailed and discrete constraints required to achieve an optimal pin-assignment. A stochastic CSP solver is used to define the cost function on search points giving full assignments to all the variables. The macro-block pins are ultimately moved to computed locations.

20 Claims, 3 Drawing Sheets

U.S. PATENT DOCUMENTS

| | | | | |
|---|---|---|---|---|
| 2001/0049814 | A1* | 12/2001 | Matsumoto et al. | 716/10 |
| 2003/0079192 | A1* | 4/2003 | Cheong et al. | 716/7 |
| 2005/0076319 | A1* | 4/2005 | Chow et al. | 716/10 |
| 2005/0138588 | A1* | 6/2005 | Frenkil | 716/6 |
| 2005/0183054 | A1* | 8/2005 | Wein et al. | 716/11 |
| 2005/0268258 | A1* | 12/2005 | Decker | 716/4 |
| 2006/0031803 | A1* | 2/2006 | Eichenseer et al. | 716/10 |
| 2006/0053396 | A1* | 3/2006 | Eng | 716/7 |
| 2006/0112362 | A1* | 5/2006 | Kitano | 716/9 |
| 2008/0046854 | A1* | 2/2008 | Tang | 716/10 |
| 2009/0282379 | A1* | 11/2009 | Singh et al. | 716/8 |
| 2010/0115487 | A1* | 5/2010 | Tripathi et al. | 716/12 |
| 2010/0257498 | A1* | 10/2010 | Alpert et al. | 716/6 |
| 2010/0270681 | A1* | 10/2010 | Bird et al. | 257/773 |
| 2011/0093828 | A1* | 4/2011 | Lee et al. | 716/126 |

OTHER PUBLICATIONS

Brady, H. Nelson., An Approach to Topological Pin Assignment, IEEE Trans. Computer-Aided Design, vol. CAD-3 (1984) pp. 250-255.

Yao., et al., A New Approach to the Pin Assignment Problem, Proc. of Design Automation Conference (1988) pp. 566-572.

Hwang, F.K., Steiner Tree Problems, Networks., vol. 22 (1992) pp. 55-89.

Sayah, et al., Design Planning for High-Performance ASICS-IBM Journal of Research and Development, vol. 40., No. 4 (1996) pp. 431-452.

Wang, et al., Simultaneous Pin Assignment and Global Wiring for Custom VLSI Design, IEEE International Symposium on Circuits and Systems., vol. 4 (1991) pp. 2128-2131.

Liu, LuChin Eugene, Multilayer Pin Assignment for Macro Cell Circuits, IEEE Trans. Computer-Aided Design, vol. 18 (1999) pp. 1452-1461.

Westra, et al., Towards Integration of Quadratic Placement and Pin Assignment, IEEE Proc. of ISVLSI (2005) pp. 284-286.

Xiang, et al., An Algorithm for Simultaneous Pin Assignment and Routing, Proc. of International Conference on Computer Aided Design (2001) pp. 232-248.

Naveh, Yehuda, Guiding Stochastic Search by Dynamic Learning of the Problem Topography, IBM Haifa Research Lab, vol. 5015 of Lecture Notes in Computer Science, Springer (2008) pp. 349-354.

* cited by examiner

CONSTRAINT PROGRAMMING BASED METHOD FOR BUS-AWARE MACRO-BLOCK PIN PLACEMENT IN A HIERARCHICAL INTEGRATED CIRCUIT LAYOUT

FIELD OF THE INVENTION

The present invention relates generally to the design of Integrated Circuits (ICs), and more particularly to bus interconnectivity of a detailed macro-block pin assignment in a hierarchical IC chip.

BACKGROUND

Macro-block pin-assignment is an integral step in any Integrated Circuit (IC) physical design and Computer-Aided Design (CAD) tools are often required to handle the design complexity. IC chips include many different components that must have electrical connections there between in order to interoperate. Typically, the chip real estate is divided into different regions with each particular component being assigned a particular region of the "floorplan".

A technique for establishing pin assignments is to assign the pins manually during floorplanning Routing tools then determine the interconnection routes to connect the respective pins. After determining the routes, a timing analysis is performed to determine if the interconnection routes meet timing constraints. Unfortunately, the timing analysis generally indicates that many of the interconnection routes fail to meet a timing constraint. A consequence of a timing violation is that the initial pin assignments need to be changed. However, once the pin assignments are changed, the routing and timing must be re-performed. Often, it takes many iterations of this cycle before finding satisfactory pin assignments. A consequence of this iteration is that the chip release date is delayed. In today competitive marketplace, time to market is important to the success or failure of a chip.

As chips become more complex and compact, the consequences of pin re-assignments becomes more severe. For example, high performance microprocessors have a substantial amount of custom layout in order to achieve the highest possible performance in the smallest die size. However, re-assigning pins lead to route changes. A possible consequence of routing changes is a need to change the custom layout. Altering a custom layout is very undesirable due to the time, difficulty, and expense. Moreover, changes to a single route can ripple to hundreds of nearby routes, especially if the track routing is dense. Because high performance custom layouts often employ dense routing, the chance of routing changes due to a pin-reassignment is quite high. Because of these and potentially other drawbacks, this approach does not provide wholly satisfactory results. Consequently, an improved method and system for determining the pin assignments for interconnections during an integrated circuit design process is desired.

The enormous complexity of high-performance microprocessor designs in ultra-deep sub-micron technologies and the short time-to-market for the Application Specific Integrated Circuits (ASIC) chips has lead to the adoption and evolution of Computer Aided Design (CAD) tools. The growing size of VLSI designs has also driven the need for hierarchical design methodologies to reduce the overall design turn-around time.

Figure 1:
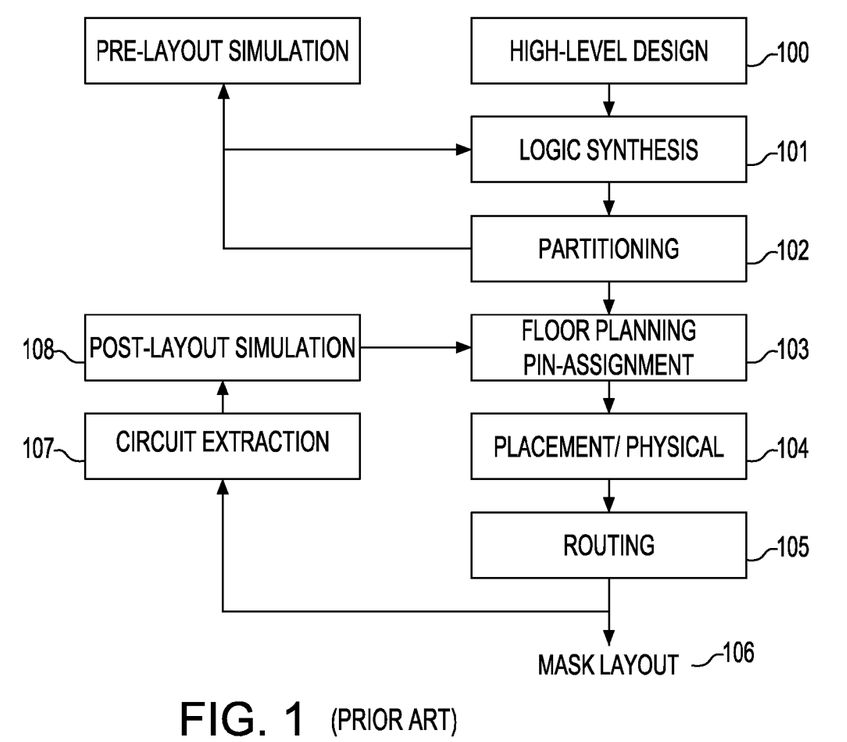
FIG. 1 illustrates a flowchart illustrating a prior art standard-cell based chip design flow.
Figure 2:
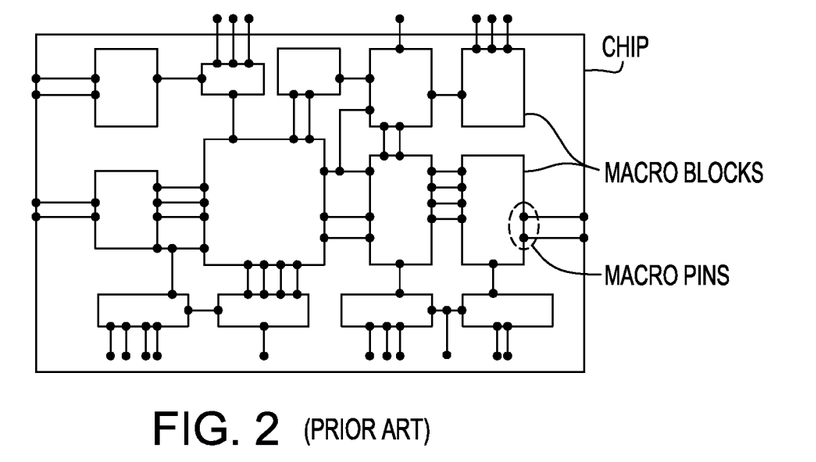
FIG. 2 shows a macro-block pin-assignment for a given IC design floorplan.

Application Specific Integrated Circuits (ASIC) chips are designed for specific applications or functions such as encoding and decoding digital data, embedded functions within a factory automation system and the like. Generally, ASIC designs adopt a standard cell design methodology wherein the circuit layout for primitive logic operations (AND, OR, NAND, XOR, and the like) are available as a standard cell library that is then used to implement the chip logic function. FIG. 1 illustrates a conventional ASIC design flow, starting with the design specification in a high-level language such as VHDL or Verilog (100), the logic synthesis phase (101) generates a cell-level implementation, i.e. netlist (interconnected cells) that is presented to a physical design to generate a layout mask for chip fabrication. The netlist is then partitioned (102) into blocks based on logic function, physical connectivity or other extraneous design constraints. At this point, the physical design implementation of the partitioned logic is considered subject to fabrication technology, chip package, I/O cells, metal layer stack for interconnect, power distribution and the like. Floorplanning (103) is the phase where the circuit blocks (partitions) are assigned an area, shape and location along with chip I/O cell placement. Once the large blocks are floorplanned, the standard cells are placed and logic optimized, referred to as physical synthesis (104), based on estimated interconnect length. Then, the connections are routed (105) along the shortest length using metal layers on a regular grid (per layer) to complete the chip implementation while meeting the design frequency targets. The generated layout mask (106) captures the geometrical shapes which correspond to the metal, oxide or semiconductor layers that make up the components of the integrated circuit. The layout is then extracted (107) and verified for electrical and functional correctness through simulations (108).

Each phase in the design flow exhibits a flavor of constrained optimization problem, as shown in a typical hierarchical IC design flow (100 to 108, in FIG. 1). For example, logic synthesis (101) attempts to minimize the cell area subject to available library cells (logic functions), delay, power and the like. Partitioning (102) divides the circuit into sub-blocks referred to as macros with a defined physical boundary and macro-block pins serving as the interface for connections from the top (chip) level to the cells within the macros (i.e., connections between cells in different macros and connections between cells and the chip's external pins), wherein the objective is to minimize cuts or interconnect crossings subject to arbitrary cell area balance criteria between the partitions; Floor-planning (103) attempts to shape and place blocks to minimize the estimated interconnect length and chip layout area subject to constraints, such as relative placement of large blocks with respect to I/O cells, spacing of cells, macro-block pin assignment (103) along the periphery of the blocks and alignment to the metal layer pitch. Placement (104) and routing (105) of cells within the macro-blocks and at the chip level have the objective to minimize the routed interconnect length subject to meeting design timing (frequency) and power constraints. A typical VLSI chip design flow presents several inherently hard multi-objective problems that are often divided into sub-problems within each design phase to be solved using CAD tools that employ a combination of optimization techniques and effective heuristics.

Pin-assignment is an integral step in any hierarchical VLSI chip design planning phase and the growing design complexity drives the need for automated solutions that produce good quality of results. However, known pin-assignment algorithms have limitations in that they either use greedy heuristics, or consider nets (pin-connections) sequentially leading to inferior solutions, or create an abstraction for continuous global optimization that ignores detailed pin-placement constraints such as pin-spacing, layer restriction and alignment.

Additionally, current methods of macro-block pin assignment require a good deal of manual intervention by a physical design engineer.

Prior literature on pin-assignment relates to different design styles ranging from printed circuit boards to recent multi-million gate integrated circuits (IC) layouts. Broadly, the existing macro-block pin-assignment algorithms can be classified as: i) pin placement on the macros to minimize the estimated top (chip) level wire length, and ii) pin-assignment coupled with global routing on a net-by-net basis. The term net refers to a set of pins (belonging to different standard cells) that are to be connected together.

Broadly, the existing macro-block pin-assignment algorithms can be classified as: i) pin placement on the macros to minimize the estimated top (chip) level wire length, and ii) pin-assignment coupled with global routing on a net-by-net basis. The term net refers to a set of pins (belonging to different cells) that are to be interconnected. More recently, simultaneous pin-assignment and global routing for all two-pin nets using network flow formulation, and pin-placement integrated with analytical cell placement using quadratic programming methods have also been described. However, the known pin-assignment algorithms have limitations in that they use either greedy heuristics, or consider nets (pin-connections) sequentially leading to inferior solutions, or create an abstraction for continuous global optimization that ignores detailed pin-placement constraints such as pin-spacing, layer restriction and alignment. Additionally, current methods of macro-block pin-assignment require a good deal of manual intervention by a physical design engineer.

BRIEF DESCRIPTION OF THE DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention, wherein like reference numerals denote like elements and parts, in which.

SUMMARY

In accordance with one aspect of the present invention, a method is provided to assign pin in a VLSI circuit. An embodiment of the invention automatically places a macro-block pin assignment using Constraint Programming (CP) techniques, placing the pins on the periphery of the macro-block while honoring bus-ordering and pin-spacing constraints while considering all nets concurrently.

In another aspect, the CP method solves problems associated with natural formulations in terms of known constraints. CP further enables constraints to be added or removed without recurring to employing heuristics solutions, ignoring modeling the detailed and discrete constraints required to achieve an optimal pin-assignment.

In another aspect, the macro-block pin-assignment is performed during the chip floor-planning phase. In a hierarchical design approach, the partitioned macros have pins which are the logical interface between the internal (macro) level cells and the top (chip) level blocks or cells. Assigning the pin locations, preferably along the periphery of the macros, minimizes the interconnect length subject to physical technology rules, such as spacing, alignment to a grid, and the like.

The present invention thus satisfies all the discrete constraints, minimizing the task of placing the pins. It further satisfies the macro-block boundaries and places layer constraints on the assigned pins by determining which pins are to be near another. This is achieved by avoiding an incremental assignment of pins since all the assignments are done globally (i.e., concurrently), thus avoiding having to create added pins, and limiting the assignment to only placing pins.

In another aspect, the invention provides a bus-interconnectivity aware method for assigning macro-block pins in a hierarchical integrated circuit (IC) floorplan including: a) accessing information related to the floorplan of the IC chip; b) grouping macro-block pins into buses based on connectivity; c) formulating a constraint programming (CP) model for macro-block pin-assignment corresponding to the floorplan, and optimizing the formulation by solving the CP model; d) minimizing length of interconnects linking the macro-blocks; e) placing the macro-block pins at a periphery of selected macro-blocks maintaining bus-ordering and pin-spacing constraints of all nets forming the floorplan; and f) reducing wire crossing by computing the macro-pins relative order within each bus-pin group.

DETAILED DESCRIPTION

The present invention will now be described in greater detail by way of the following discussion with reference to the drawings that accompany the present application. It is observed that the drawings of the present application are provided for illustrative purposes only.

The IC design flow presents several feasibility and optimization problems that demand efficient and effective algorithms to be developed in the CAD tools.

Described hereinafter is an automated macro-block pin-assignment method using constraint programming (CP) techniques taking advantage of the flexibility offered by CP, whereby constraints may be easily added or removed, an important advantage in a domain where different problems (stemming from different design methodologies, different hardware technologies, different levels in the design hierarchy, and the like) are similar but not identical to each other. Compared to other existing pin-assignment algorithms, the proposed technique provides the capability of directly modeling physical constraints (pin-spacing, layer restriction, alignment, bus-ordering, and the like) when performing a global optimization. However, the prior art has not focused on applying CP techniques to the IC physical design problems. Described hereinafter are the techniques that have been advantageously implemented in various embodiments of the invention.

Figure 3:
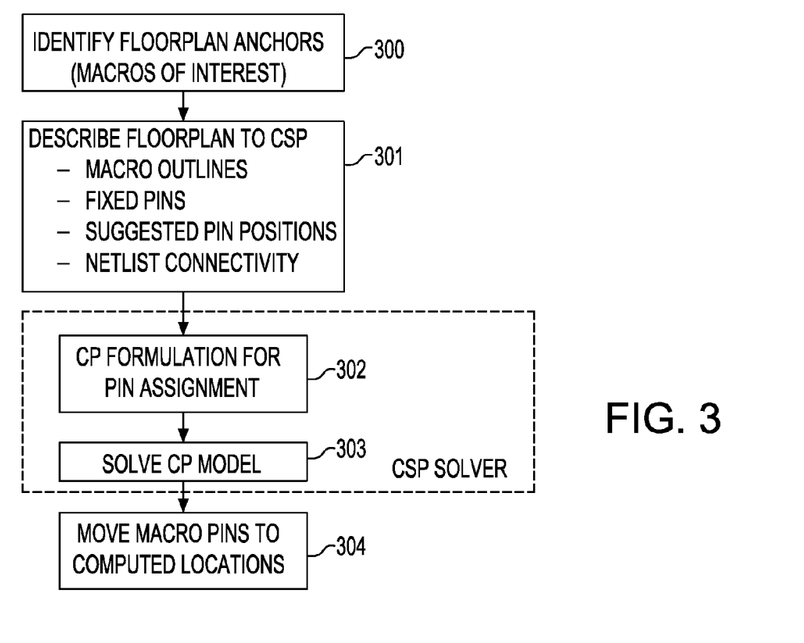
FIG. 3 is a flow chart illustrating a Constraint Programming based Pin Assignment (ConsPa), in accordance with an embodiment of the present invention.
Figure 4:
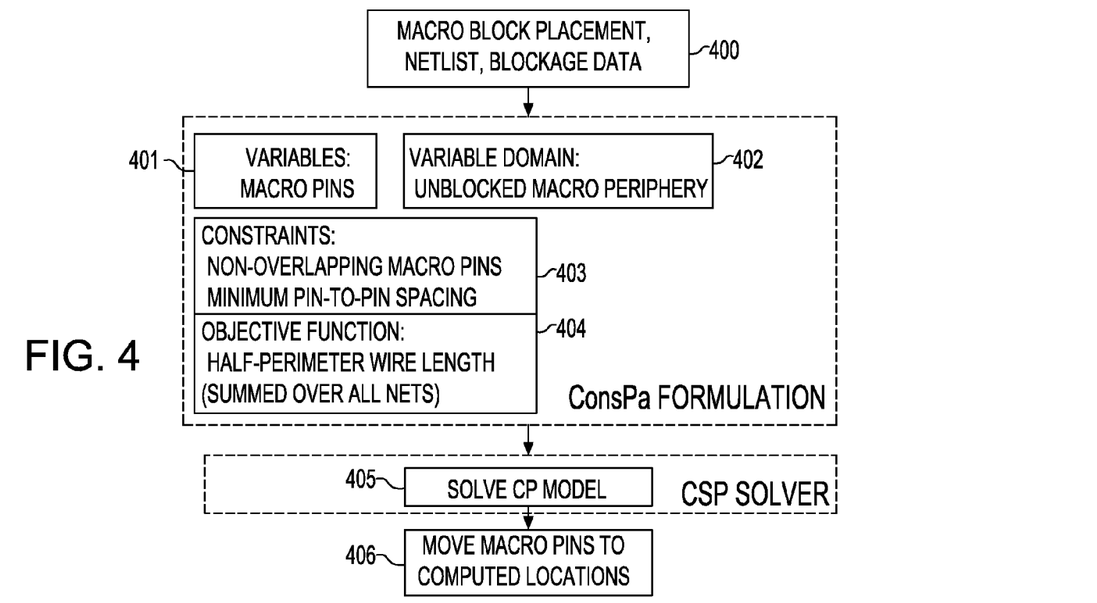
FIG. 4 illustrates the pin-assignment formulation of the ConsPa method, according to an embodiment of the invention.

Referring to FIG. 3, the overall design process flow of the present invention on Constraint Programming (CP) based Pin Assignment (ConsPa) is illustrated. The method begins with a floorplan of a VLSI circuit in which macro-blocks (FIG. 1, 102) have been placed but where macro-block pins are yet to be assigned. The first step involves identifying the macros of interest (FIG. 3, 300) in the given floorplan for which the macro-block pins are assigned using ConsPa. The invention presents a general case wherein during early floorplan phase all the macros in the VLSI circuit are referred as macros of interest (FIG. 3, 300), while the design matures, only a subset of the macros may be subject to pin-assignment to facilitate incremental changes towards design closure. The next step consists of capturing and representing the macro-block floorplan (FIG. 3, 301), including macro-block outlines, interconnections (nets) between the macro-blocks, pre-assigned fixed pin locations, and seed locations (initial suggestions) for macro-block pins to drive the macro-block pin-assignment using ConsPa. Given the floorplan representation, the next step is to model the pin-assignment problem as a Constraint Programming (CP) formulation (FIG. 3, 302), that will be described hereinafter in greater detail later (FIG. 4, 401).

The CP formulation for pin-assignment is solved using a stochastic Constraint Satisfaction Program (CSP) solver (FIG. 3, 303). Stochastic CSP solvers operate by defining a non-negative cost function on the points of the search space (full assignments to all variables corresponding to macro-block pins in the problem). The cost of a point is zero if the point is feasible, i.e., it satisfies all the constraints, and is otherwise positive. Intuitively, the cost of a point corresponds to a measure of how far the point is away from feasibility. Typically, the cost of a point is defined as the sum of the individual costs attached by its corresponding constraints, i.e., there is a cost function (on the full assignments) associated with each constraint, intuitively measuring by how much the constraint that has been violated is by an assignment where none is deemed satisfactory, the cost of the point being the sum of the individual costs. Appropriate cost functions are defined as part of the problem modeling phase (FIG. 3, 302).

The CP solver (FIG. 3, 303) begins with a randomly (or otherwise, based on seed pin locations) chosen full assignment for the CSP variables. For each iteration, it examines a random sample of the "neighborhood" of the current assignment, and attempts to find an assignment having a lower cost. This is repeated until a feasible point is found or timeout occurs. Of course, the CP solver may be augmented with heuristics to accelerate the search and to escape from local minima. This approach can also be extended to solve constrained optimization problems by similarly defining an optimization objective function which is used once feasibility has been attained.

Figure 5:
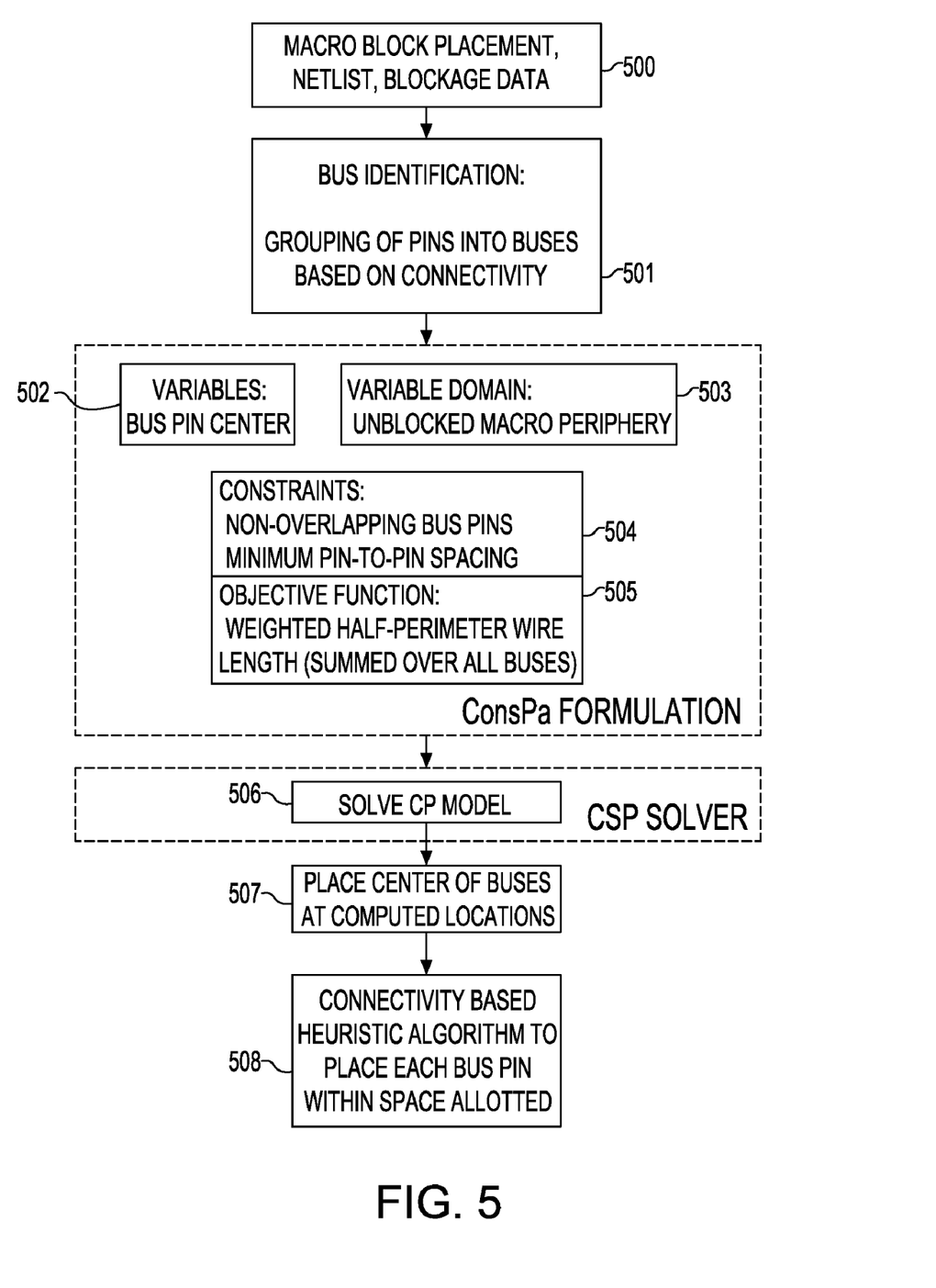
FIG. 5 illustrates the bus-driven Constraint Program pin-assignment method, according to an embodiment of the invention.

The method described in an embodiment of the present invention is based on Stocs—a stochastic CSP solver (FIG. 3, 303; FIG. 4, 405; FIG. 5, 506) that is capable to solve constraint optimization problems as well as pure feasibility ones. The final step in ConsPa is to move the macro-block pins (FIG. 3, 304) to the macro-block periphery locations as computed by the CP solver in the previous step (FIG. 3, 303). The desired macro-block pins locations satisfying the physical constraints are thus realized by the method described in this invention.

Described hereinafter is the pin-assignment formulation and modeling in ConsPa (FIG. 4). The particular design problem to be solved is the following: where macro-blocks are already placed at fixed locations on the floorplan with a given interconnect (nets) and wiring blockage data (FIG. 4, 400), such that the problem is to place the pins on the macro-block edges. The overall objective places the pins such that wiring them (in later stages of the design process) will be feasible. The pin assignment problem arises at a point in the design flow at which there is not enough data available to develop exact constraints that will capture wiring feasibility. In fact, it is premature to attempt the assignment since the design is expected to evolve significantly before the wiring stage is reached. Thus, rather than attempting to satisfy any number of detailed wiring constraints, one may preferably substitute the optimization objective for the feasibility goal (FIG. 4, 404). Since the main wiring constraints typically translate into a wire length constraint, preferably, one may strive to minimize the total wire length (FIG. 4, 404). Of course, the actual routing is located downstream in the workflow, so one can only roughly estimate its value. The commonly used half-perimeter wire length (HPWL) measure (FIG. 4, 404) is preferably employed, which can be computed relatively quickly and is sufficiently accurate as an approximation. In the present method, the total wire length of a single net is estimated as half the perimeter length of the smallest bounding rectangle containing the net's pins. Since wiring is done rectilinearly, the most economic routing is through the shortest rectilinear Steiner tree connecting the pins. HPWL is an exact estimate of the length for the nets connecting up to three pins, with a lower bound for larger nets. In addition to the wiring objective, there are also various constraints on the pin locations (FIG. 4, 403). Specifically, pins may not overlap (on the same metal layer), they must be located on macro-block edges, and may not be placed in certain blockage areas (e.g., on the power or ground grids) which are captured in step 403, FIG. 4.

In an embodiment, macro-blocks reused multiple times in a given design are considered. The design may contain several copies, referred to as 'instances' of a macro. Moreover, they may be rotated or mirrored as well. An important aspect of the present invention is that pin-assignment be preferably done per macro-block and not per instance, so that all copies of a macro-block share the same (relative) placement of pins. This may render the problem more difficult to solve because different instances of the same macro-block may benefit from different pin-assignments, but only one assignment is allowed. Thus, a compromise must be struck.

The modeling of the pin locations in the ConsPa method (FIGS. 4, 401 and 402) is now described. A preferable way to model pin locations is through two-dimensional x-y coordinates. However, the requirement that pins must be placed on the edges of their macros allows the use of a one-dimensional modeling, wherein the location of a pin is determined by the distance from the macro's origin (lower left corner) going clockwise through the macro's perimeter. This modeling has the advantage of reducing the number of variables (FIG. 4, 401) and simultaneously obviates the pins-on-macro-edges constraint (FIGS. 4, 402 and 403). On the other hand, calculating the HPWL objective function (FIG. 4, 404) requires the conversion of relative one-dimensional pin locations to absolute two-dimensional coordinates. Nevertheless, the advantage offered by the one-dimensional modeling far offsets the penalty of increased objective function computation time. Therefore, a one-dimensional modeling is preferably used. Note, that pin locations are non-negative integers in a finite range since pins must be located for a specified pin placement grid whose lines are called tracks (FIG. 4, 402). Furthermore, if—as is the case in designs that have been encountered—the pin size is smaller than the distance between two adjacent grid points, then the non-overlap constraint (FIG. 4, 403) can be simplified into an all different constraint on the pin locations (of pins belonging to the same macro).

In the ConsPa pin-assignment formulation, macro-block pin locations are represented by variables (FIG. 4, 401) with a variable domain (FIG. 4, 402) spanning the wiring unblocked macro-block periphery. Denoting the set of pins by P, and the set of macros by M. Let Macro: P→M be the function mapping pins to their macros (i.e., pin p belongs to macro-block Macro(p)). Also, for each macro-block m∈M, denotes the macro's perimeter length in track units by Perimeter (m)∈N. A CSP variable $v_p$ for each pin p∈P is defined, with domain $D_p=\{0, \ldots,$ Perimeter (Macro(p))−1$\}$. Blockages are modeled by simply deleting forbidden pin locations from the corresponding domains (FIG. 4, 402). Aside from the pins-on-edges and blockage constraints (FIG. 4, 402) as modeled above, the other constraint is the non-overlapping pin placement which is captured for each macro, m, by introducing a constraint AllDiff$\{v_p|$Macro(p)=m$\}$. If the pin sizes are greater than the grid dimension, it is preferable to use instead a one-dimensional no-overlap constraint (with wraparound at the macro's origin).

In another embodiment, the modeling of the objective function for optimization is described (FIG. 4, 404). In order to describe the objective function, one needs to first formalize the connectivity between pin instances in the design. (Note: pins are defined with respect to macros. Hence each pin may have multiple instances in the design—one per instance of the corresponding macro.) Let I denote the set of all macro-block instances, and for each instance i∈I let Macro(i)∈M denote the corresponding macro. An instance can be placed anywhere on the grid, rotated by right angles, or mirrored. A pin instance is a pair (i, p)∈I×P such that Macro(p)=Macro(i). The connectivity between pin instances is defined by a set of nets N. Each net n∈N is a subset of I×P, namely, the set of all pin instances connected by the net. A pin instance (i, p) may only appear in a single net n∈N, which is denoted by Net(i, p).

For every macro-block m, a function $Rel_m: \{0, \ldots,$ Perimeter (m)−1$\} \to R^2$ is defined that converts a one-dimensional pin location on m's perimeter to the corresponding two-dimensional coordinate pair relative to the macro's origin. This function can be readily computed by first determining on which edge the pin location falls (based on the macro's dimensions), then the relative position on that edge, and finally the relative position with respect to the macro's origin.

For each macro-block instance i∈I, a function $Abs_i: R^2 \to R^2$ is determined that transforms a coordinate pair relative to the macro's origin to absolute coordinates. This function is implemented by considering the placement, rotation and mirroring of the instance i, and converting the coordinates accordingly. Finally, given a pin instance (i, p) and a pin location x∈$D_p$, the corresponding absolute two-dimensional coordinates are given by $Abs_i (Rel_{Macro(i)}(x))$.

The objective function is therefore

$\Sigma_{n \in N} Hpwl(\{Abs_i(Rel_{Macro(i)}(v_p))|(i,p) \in n\}$, where      i.

Hpwl(.) is the half perimeter wire length function defined by

$Hpwl(\{(x_1,y_1), \ldots, (x_k,y_k)\}) = \frac{1}{2}(\max\{x_1, \ldots, x_k\} - \min\{x_1, \ldots, x_k\} + \max\{y_1, \ldots, y_k\} - \min\{y_1, \ldots, y_k\})$.      i.

For a given point in the search space, i.e., an assignment of values to all variables, each constraint must be assigned a non-negative cost which (intuitively) reflects the degree to which the constraint is violated by the assignment. In an embodiment of the invention, a natural cost function of total amount of overlap is used, defined as the sum over all pin locations in which pins are placed of the number of pins overlapping in that location minus one (i.e., a location containing one pin contributes 0 to the cost; a location containing two pins contributes 1; a location containing three pins contributes 2, and the like).

The described pin-assignment formulation in ConsPa (FIG. 4, 401; 402; 403; 404) is then optimized using a stochastic CSP solver (FIG. 4, 405) which has the ability to solve constraint optimization problems as well as pure feasibility ones. The macro-block pins are moved to x- and y-locations (FIG. 4, 406) based on the solution obtained from the CP solver (FIG. 4, 405).

In an embodiment of the invention, a bus-driven pin-assignment is described. Due to the complexity of modern VLSI circuits there are typically several hierarchical macro-blocks with vectored data signals in the form of busses interconnecting them, wherein "bus" is a collection of interconnects between blocks that operate or apply a function on a vector of "data bits", e.g. 128 bit, 256 bit, and the like. This aspect of the design presents a requirement to plan the macro-block pin placement such that it enables the bus-style interconnects routing between such macros. A random assignment of locations for pins within a bus-style interconnects usually leads to timing and routing closure problems in the chip. The present invention preferably places a bus-driven pin-assignment along with the random signal pins on macro-blocks of the circuit, while optimizing the interconnect length between the macros.

Described hereinafter is the bus-driven pin-assignment formulation and modeling using Constraint Programming technique (FIG. 5). Similar to the general ConsPa method (FIG. 4), a particular design problem is to place the pins on the macro-block edges, wherein macro-blocks are already placed at fixed locations on the floorplan with a given interconnect (nets) and wiring blockage data (FIG. 5, 500). The overall objective is to place pins such that wiring them (in later stages in the design process) remains feasible. A significant aspect of the embodiment is to consider pins that are part of bus-style interconnect and place them in an overlap-free manner as a whole with certain bit-order such as to minimize the interconnect length between the macros. Formally, the set of buses is referred as B. Each bus b∈B is a set of pins belonging to the same macro. The bus to which pin p belongs is denoted by Bus(p). For each bus b∈B, there is a variable $v_b$ whose domain is $D_b=\{0, \ldots,$ Perimeter (Macro(b))−1$\}$. Since the CSP is defined in terms of buses, one must also introduce the notion of bus net. Specifically, a bus instance is a pair (i, b)∈I×B, such that Macro(i)=Macro(b). The bus net corresponding to net n∈N is defined as the set of bus instances BusNet(n)=$\{$(i, Bus(p))|(i,p)∈n$\}$.

Described hereinafter is a set of pins of a given macro-block to be partitioned into buses (i.e. bus-identification FIG. 5, 501). Preferably, for simplicity, one may use names given by a designer to the pins in order to group similarly named pins into the buses. (Typically, pins are grouped by the designer into buses and corresponding names reflect thereof, i.e., the $k^{th}$ pin of bus X will be referred to X<k>.) However, difficulties may arise when different pins in the same bus have different connectivity (e.g., the most significant bit of a data bus may connect identically as all other bits in the bus, but additionally to macros concerned exclusively with the sign). The additional constraint that buses must be placed as a whole can impact the solution's cost. The opposite can occurs when designers, who typically define and name buses based on their functionality rather than connectivity, group pins with identical connectivity into multiple buses. In this case, grouping by name can be excessive and can lead to unnecessary bloating of the CSP model. Therefore, buses should be grouped according to their pin destinations. Pins of the same macro-block are grouped only when they are connected to the same set of macro-block instances. One may also split buses in cases where the bus is connected to pins that would otherwise be grouped into a single bus in one instance, but into multiple buses in another.

More specifically, pin grouping algorithm (FIG. 5, 501) consists of the following:
1. Calculate for each pin instance (i, p) its instance set: {i'∈I|(i',p')∈Net (i,p)}.
2. Group pin instances that have identical instance set and belong to the same macro-block instance.
3. For each macro, split the aforementioned groups so that no group differs between two instances of the same macro-block. The resulting partitioning of the macro's pins is used to create the buses thereof.

The constraint program modeling for the bus-driven pin-assignment (FIGS. 5; 502, 503, 504 and 505) solves a more constrained problem: instead of having each pin placed individually, a set of pins are grouped to form buses, letting the CP model place each bus as a whole. Thus, the position of each bus is modeled as a single CSP variable (FIG. 5, 502), significantly reducing the number of variables and CP model size for the solver to handle in a reasonable amount of time. For designs with a large number of pins, such a bus-driven modeling also scales very well. BusNets, as previously defined, may correspond to multiple nets in the design and nets with identical connectivity relative to the respective bus-pins on the macros would have the same BusNet. Therefore, multiple nets with the same BusNet representation are captured by a single BusNet in the CP model. The semantics of a bus position variable (FIG. 5, 503) remains the same as previously stated (FIG. 4, 402), i.e., the distance of the bus center from the macro's origin, rotating in a clockwise direction through the macro's perimeter. Since a given bus net may correspond to multiple nets, the number of nets for which BusNet x substitutes in the CP model is denoted by Width (x), i.e. Width (x)=|{n∈N|BusNet (n)=x}|.

"Non-overlap constraints" (FIG. 5, 504) are now defined in terms of buses rather than pins. They ensure that no two buses overlap, which requires taking the bus sizes (Width (x)) into account. The size of a bus is proportional to the number of pins therein. Finally, one may also modify the objective function by using weighted distances between bus center points rather than between pins. Specifically, let $N_B$ denote the set of bus nets. Then the objective function (FIG. 5, 505) is given by equation:

$$\Sigma_{x \in N_B} \text{Width}(x) * \text{Hpwl}(\{Abs_i(Rel_{Macro(i)}(v_b))|(i,b) \in x\})$$

As previously mentioned, non-overlapping constraints must take the bus sizes into account. Specifically, given any two buses $b_1$ and $b_2$ (belonging to the same macro) they must satisfy First $(b_1)$>Last $(b_2)$ V Last $(b_1)$≦First $(b_2)$, where First (b) and Last (b) are the two endpoints of the bus b calculated based on the value assigned to $v_b$ and b's size. (Recall that bus locations are modeled one-dimensionally.) However, such a simple condition may not be valid for buses wrapping through the macro-block's origin, in which case a more elaborate condition is required. To sidestep this issue, whenever such a situation arises, one may advantageously split the bus in two at the origin.

The algorithm used for computing the violation cost of the no-overlap constraint (FIG. 5, 504) for a given macro-block instance is as follows:
1. Split any buses wrapping through the origin.
2. Sort together the starting and ending points of all buses. Maintain for each point its identity as a starting point or ending point.
3. Iterate through the sorted list of points keeping track of the number of starting points encountered, $n_s$, and the number of ending points encountered, $n_e$.

Let x' be the previous point and x" be the current point. Then $n_s - n_e$ is the number of buses passing through the interval between x' and x". Thus, add max $\{0, l(n_s-n_e-1)\}$ to the violation cost, where l is the length of the interval between x' and x". The running time of this algorithm is linear in the number of buses, except for the sorting step, which takes O(n log n) time.

Hereinafter, the post-processing steps (FIGS. 5, 507 and 508) are described. Bus centers are placed at the macro-block boundary locations identified from the CSP solver (FIG. 5, 506) based on the given bus-driven CP model for pin-assignment. After solving the CSP, there is still a need to provide a placement for all the pins. In the post-processing phase (FIG. 5, 508) the constituent pins of each bus are preferably placed contiguously within the space allotted to the bus. Ordering the pins within a bus is done so that pins in buses connected to each other have the same relative ordering, up to their clockwise/counter clockwise orientation. Then, for each bus there are two options to order its pins: either clockwise or counter-clockwise. Depending on the relative positions of the macro-block instances involved, and on whether they are mirrored or rotated, different orientations for different buses may be desired. Both orientations for each bus are heuristically tested independently, the one yielding the lower cost being preferably selected. More specifically, one may begin with random orientations, iterate through the buses in random order, and for each bus one should preferably invert its orientation if doing so lowers the overall cost.

Model Improvements

In one embodiment, the above model can be improved by avoiding bus-pins wrapping around the corners of the macro-block boundary. Some of the buses are occasionally placed close to the corners of their macros, wrapping around the corner due to the fact that the objective function only considered the center of the bus without caring whether or not the entire bus was on the same edge as the center point. However, such a placement usually entails a greater cost (once the individual pins are laid out) than a placement wherein the entire bus is located on the same edge. To alleviate the problem, one may advantageously use a modified version of the cost function which calculates for each bus net the average of two HPWL values, one for each of the two ends of the connected buses. In this manner, the cost of wrapping-around a corner tends to be higher than not doing so, and the solver gravitates to solutions in which buses do not wrap around corners.

The present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A combination of hardware and software can be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out the methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A bus-interconnectivity aware method for assigning macro-block pins in a hierarchical integrated circuit (IC) chip floorplan comprising:
   a) using a computer, accessing information related to the chip floorplan of said IC chip;
   b) grouping macro-block pins into buses based on connectivity;
   c) formulating a constraint programming (CP) model for macro-block pin-assignment corresponding to said chip floorplan, and optimizing said formulation by solving said CP model;
   d) minimizing length of interconnects linking said macro-blocks;
   e) using a computer, placing said macro-block pins at a periphery of selected macro-blocks maintaining bus-ordering and pin-spacing constraints of all nets forming said chip floorplan; and
   f) reducing wire crossing by computing said macro-pins relative order within each bus-pin group.

2. The method as recited in claim 1, wherein in step e) said placing said macro-block pins at the periphery of selected macro-blocks is performed on all the nets of said IC chip design concurrently.

3. The method recited in claim 1 wherein said CP formulation comprises modeling discrete constraints required to achieve a realizable pin-assignment.

4. The method recited in claim 1, further comprising using a Constraints Satisfaction Program (CSP) solver by defining a cost function on search points giving full assignments to all variables.

5. The method recited in claim 4, wherein said CSP uses a stochastic process.

6. The method as recited in claim 4 further comprising defining said CP formulation for said pin assignment and solving predetermined constraint satisfaction criteria (CSP).

7. The method recited in claim 4 wherein said cost of a point corresponds to a measure of how far said point is from feasibility.

8. The method recited in claim 4 wherein said cost of a point is a sum of individual costs attached by said constraints.

9. The method as recited in claim 4, wherein following said invocation of said CSP, placing all the pins is obtained by ordering the pins of each bus in a region allotted to said bus.

10. The method as recited in claim 9, wherein said ordering of the pins within a bus enables the pins forming said buses to be grouped together in accordance to their relative same ordering and according to their respective clockwise or counter-clockwise orientation.

11. The method as recited in claim 9, wherein for each bus ordering the pins is performed either clockwise or counter-clockwise depending on relative positions of macro-block instance and depending on whether they are mirrored or rotated, different orientations are used for different buses.

12. The method as recited in claim 11, wherein said orientations for each bus are heuristically tested independently and selected based on buses yielding a lower cost.

13. The method as recited in claim 11, wherein random orientations are initially performed, followed by iterating through said buses in a random order, and wherein each bus is inverted when its orientation is found to lower said cost.

14. The method recited in claim 1 wherein said CP includes problems having natural formulations in terms of known constraints.

15. The method recited in claim 1, wherein constraints are added or removed.

16. The method as recited in claim 1, wherein said formulation of CP for said pins further comprises:
   i) variables representing macro-block pins;
   ii) variable domains comprising un-blocked macro-block periphery;
   iii) constraints including non-overlapping macro-pins and minimum pin-to-pin spacing; and
   iv) objective functions comprising half-perimeter wire length summed over all the nets.

17. The method as recited in claim 1, further comprising computing violation costs of non-overlap constraint of a macro-block instance, comprising:
   i.) splitting buses wrapping through a macro-block origin;
   ii.) sorting together starting and ending points of all said buses, keeping for each point its identity as a starting point or ending point; and
   iii.) iterating through the sorted points keeping track of a total number of starting points encountered and the number of ending points encountered.

18. The method as recited in claim 17, wherein said buses formed by sets of pins grouped together have constituent pins of each bus placed contiguously within a space allotted thereto, enabling each bus thus positioned to be modeled as a single Constraint Satisfaction Criteria (CSP) variable.

19. The method as recited in claim 1, further comprising performing said pin-assignment per macro-block and not per instance, wherein all copies of a macro-block share same relative placement of pins.

20. A program storage device readable by a machine, tangibly embodying a program of instructions executable by the machine to perform method steps of providing a bus-interconnectivity aware method for assigning macro-block pins in a hierarchical integrated circuit (IC) chip floorplan, the method steps comprising:
   a) using a computer, accessing information related to the chip floorplan;
   b) grouping macro-block pins into buses based on connectivity;
   c) formulating a constraint programming (CP) model for macro-block pin-assignment corresponding to said chip floorplan, and optimizing said formulation by solving said CP model;
   d) minimizing length of interconnects linking said macro-blocks;
   e) using a computer, placing said macro-block pins at a periphery of selected macro-blocks maintaining bus-ordering and pin-spacing constraints of all nets forming said chip floorplan; and
   f) reducing wire crossing by computing said macro-pins relative order within each bus-pin group.

* * * * *